Patented Jan. 11, 1949

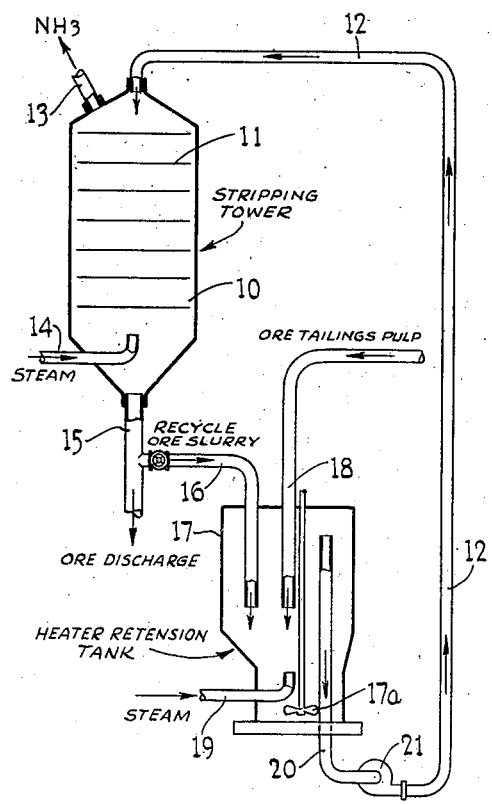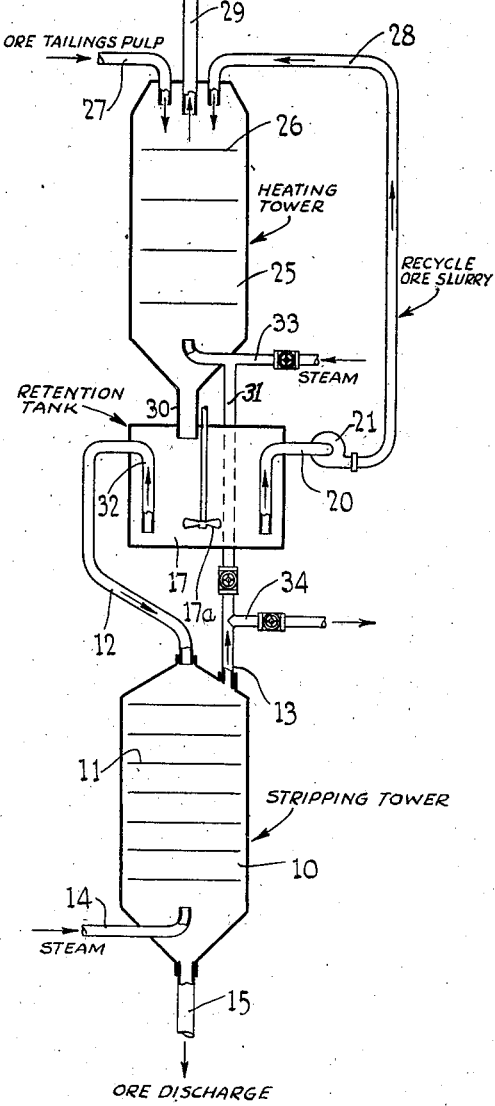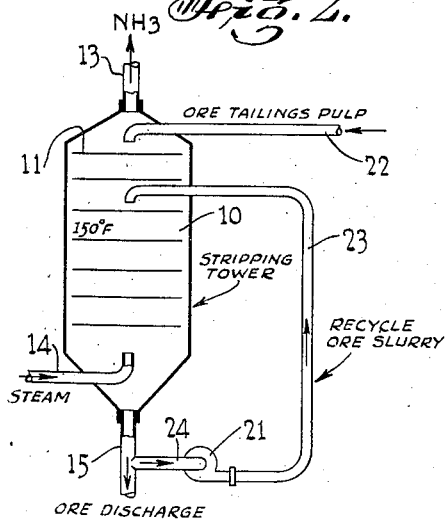

2,458,902

UNITED STATES PATENT OFFICE 2,458,902

RECOVERY OF AMMONIA FROM ORE TAILINGS PULP

Robert R. Fitzhugh, Nicaro, Cuba, and Benjamin F. Frederick and Bernard A. Axelrad, Freeport, Tex., assignors to Nicaro Nickel Company, New York, N. Y., a corporation of Delaware Application October 7, 1943, Serial No. 505,402

10 Claims. (Cl. 23—193)

This invention lies in the field of metal recovery from nickeliferous and other ores and relates specifically to methods of recovering residual ammonia contained in tailings pulps from which the nickel, copper, cobalt or other metal content has been leached by means of an ammoniacal leaching solution.

In a patent application filed by our associate, Robert C. Hills, Serial No. 467,559, filed December 1, 1942, now Patent No. 2,400,114, a process of recovering nickel from various ores is described involving crushing the ore to a finely divided state, roasting and cooling it in a reducing atmosphere, leaching out the nickel content with an ammoniacal solution during aeration and separating the nickel from the leaching solution. Recovery of the residual nickel and ammonia in the ore tailings pulp, to which problem the prior application is particularly directed, is described therein as being accomplished by washing the spent ore with fresh leaching solution or other ammoniacal solution of a sufficiently high concentration to prevent the nickel content from precipitating out and then recovering the ammonia of the ammoniacal solution retained in the tailings pulp by passing the pulp through a plate tower wherein the ammonia is distilled off with the aid of direct steam.

This ammonia distillation process is described more in detail in said prior specification as preferably involving pumping the ore tailings pulp into the top of a multiplate distillation tower from which it passes to the bottom of the tower in countercurrent movement to a supply of steam introduced at the bottom of the tower. Concentrated ammonia vapors are disclosed to pass out of the top of the tower where they may be condensed and collected in conventional apparatus, and the spent ore slurry containing only a small amount of the original ammonia content is said to be discharged to waste from the bottom of the tower.

Operation of this ammonia recovery process in conventional plate towers has been found by the present applicants to involve difficulties due to deposition of a scale on the surfaces of the top plates which prevents continuous or uninterrupted operation. An examination and analysis of this scale revealed that it is composed of a mixture of magnesium compounds and fine particles of ore. Apparently its presence is due to the existence of magnesium impurities in the initial ore treated and to the presence of a complex salt, ammonium magnesium carbonate, in the spent ore tailings, which salt is dissolved during the initial heating in the plate tower.

Upon further heating of the pulp on the top plates of the tower, the complex magnesium ammonium carbonate hydrolyzes and precipitates the magnesium apparently in the form of its hydroxide or its carbonate. Since the deposition of the scale has been found to occur wherever heat is transferred to the pulp, such as at vapor nozzles, bubble caps and the top sides of the plates, it is evident that the transfer of heat to the pulp from hot surfaces during hydrolysis is at least in part the cause of the formation of the scale.

In accordance with a preferred process of the present invention and following the foregoing discoveries, the deposition of the scale is prevented by accomplishing all or part of the heat treatment of the ore tailings pulp by direct transfer from a heated fluid or fluids. This heating operation is effectively and economically carried out in accordance with the present invention by recycling hot ore tailings slurry from which the unstable magnesium compounds have already been removed as by precipitation and also separation, if so desired. The introduction of the hot recycled slurry into the ore tailings pulp to be treated also has the beneficial result and advantage of slowing down the rate of precipitation of the magnesium compounds by dilution effect. Dilution of the magnesium concentration in the pulp liquor to a point at or below about .02 gram per 100 cc. has been found to prevent excessive deposition of scale. Instead of adhering to the surfaces of the plates of the ammonia stripping column, the magnesium compounds appear to deposit on the hot ore particles.

In one embodiment of the invention, ore tailings pulp containing the ammonia solution to be recovered and .05 to .11 gram of combined magnesium per 100 cc. of liquor is introduced into an auxiliary tank to which is added a quantity of hot recycled ore slurry from which the ammonia content has been recovered in a previous run of the process. The mixture is further heated in the tank, preferably by means of direct steam, and is retained therein until the magnesium content has for the most part precipitated out on the spent ore particles. Supplemental mechanical agitation may be employed in the tank if necessary to prevent settling and deposition. Thereupon the pulp, freed of unstable magnesium compounds, is withdrawn and is then introduced into the hereinbefore mentioned ammonia stripping tower wherein it is deprived of its ammonia content in accordance with the process of said prior application. Since the magnesium compounds are no longer present in an unstable form, little or no deposition of magnesium occurs on the surfaces of the plates, and the ammonia stripping operation in the tower may be continued for long periods of time without interruption.

Since the conversion of the soluble magnesium compounds into the insoluble magnesium compounds is a time reaction, the period during which the mixture of ore tailings pulp containing the ammonia solution to be recovered and the spent ore slurry is retained in the tank should be correlated with the temperature maintained in the tank. If the temperature is maintained at 170°–175° F., a period of heating of twenty minutes is usually sufficient. If a higher temperature of 190° F. or above is employed, seven to ten minutes is generally sufficient.

The ratio of ore tailings slurry to the ammonia-containing ore tailings pulp may be varied considerably, a ratio of 2:1 giving good results with the type of ore of the nature hereinbefore described. Ratios as low as 1:1 and as high as 5:1 may be employed, however. The ratio preferred in any particular operation of the process depends upon the quantity of magnesium impurities present and upon the temperature to be obtained in the feed pulp from the recycle stock. The larger the amount of recycled ore tailings slurry employed, the lesser the amount of steam heat required in the heating zone to complete the hydrolysis of the soluble magnesium compounds. The spent ore tailings slurry is most economically employed at the temperature it is obtained in the process, for if it is permitted to cool, additional steam is required to raise its temperature and the temperature of the initial ore tailings pulp to a height at which the hydrolysis will occur in a reasonable period of time.

In a second embodiment of the invention, a portion of the spent hot ore slurry is recycled and introduced directly into the ammonia stripping column near the top thereof at such point that it mixes with the ore tailings pulp containing the ammonia solution to be recovered when the latter is at a temperature of somewhat less than 150° F. Deposition of magnesium compounds on the equipment is prevented by effecting the hydrolysis of the soluble magnesium compounds in the presence of hot ore particles, by the dilution effect of the added slurry, and by the increase in velocity and abrasive effect of the ore particles passing through. Since this embodiment does not separate the functions of scale prevention and ammonia stripping, more careful regulation of conditions in the ammonia stripping tower is required. It has the economic advantage, however, in not requiring live steam at the point where the precipitation takes place nor an additional amount of steam in the column.

In accordance with a third and preferred embodiment of the invention, recycled ore slurry obtained as hereafter described is introduced together with ore tailings pulp containing ammonia at the top of an auxiliary heating tower containing several plates. In the heating tower, the temperature of the mixture is raised by the countercurrent flow of the ammonia gases and vapor flowing from the ammonia stripping column, which gases are introduced into the bottom of the heating tower and from which they pass out at the top thereof. The heated mixture of pulp and slurry is then passed to an auxiliary retention tank wherein the same is retained until hydrolysis of the soluble magnesium compounds has taken place. Part of the mixture thus obtained is recycled and introduced into the top of the auxiliary heating tower as hereinbefore described. The remainder of the mixture is then passed to the top of the ammonia stripping column through which it flows in countercurrent to a supply of steam which volatilizes the ammonia. The ammonia and the spent steam or vapor passes through the heating column and thence to a recovery system.

This third embodiment is of particular advantage for the reason that the sensible heat of the ammonia gases and vapor is utilized in the preheating tower. The use of the plate heating tower, and in particular one of the dish-tray type, is of a material advantage in that the low pressure of the ammonia gases and vapor as obtained from the ammonia stripping column is sufficient to force its way through the heating tower in contact with the pulp and slurry flowing therethrough in countercurrent. If the heating were effected in an ordinary tank of high pressure drop such as employed in the first embodiment described herein, difficulty or extra expense would be encountered in forcing the gases through the tailings.

In a typical run of this third embodiment, the ore tailings pulp containing the ammonia to be recovered is introduced into the heating tower at a temperature of about 120° F. and the recycled slurry at a temperature of about 190° F. The ratio of the latter to the former is maintained at about 2:1. The mixture at the top of the tower under these conditions would have a temperature of about 170° F. In passing through the heating tower, the temperature of the mixture is raised to about 190° F. The mixture is retained in the retention tank for about twenty minutes, after which it is divided, part of which is recycled and the other part of which is led to the ammonia stripping column.

Drawings are included herewith to illustrate apparatuses in which the various embodiments of the invention may be carried out. It should be understood, however, that the invention is not limited to any specific details of construction and that it may be practiced in other apparatus except where otherwise indicated herein. The figures are diagrammatic in character and consequently do not show many conventional details of construction, valves, and the like, required for actual operation.

With reference to Figure 1, illustrating an apparatus in which the first embodiment of the invention may be carried out, there is an ammonium stripping tower 10 having a series of conventional plates 11 arranged therein in the usual manner. At the top of the tower there is provided an inlet 12 for the introduction of a mixture of ore tailings pulp containing ammonia to be recovered, with recycled slurry. An outlet 13 is also provided at the top of the tower for the outward passage of ammonia gases and vapor, which passage leads to a conventional ammonia recovery apparatus (not shown). Near the bottom of the tower, there are provided a conduit 14 for the introduction of live steam and an ore discharge conduit 15. This conduit 15 contains a branch valved conduit 16 leading to a heater retention tank 17. This tank 17 is provided with an agitating means 17a, an inlet 18 for introducing ore tailings pulp containing ammonia to be recovered, a live steam inlet conduit 19, and an outlet conduit 20 for the mixture of the recycled ore slurry and the ore tailings pulp. This conduit 20 connects through the pump 21 with the inlet conduit 12 connected to the top of the ammonia stripping tower 10.

With reference to Figure 2, there is illustrated an apparatus in which the hereinbefore mentioned second embodiment of the invention may be carried out. The stripping tower 10 is of the same general construction as the tower illustrated in Figure 1, but in this embodiment means are provided for introducing the ore tailings pulp separately from the recycled ore slurry. A separate conduit 22 is provided for introducing the ore tailings pulp at the top of the tower 10. A conduit 23 for the recycled ore slurry is connected with the tower 10 and discharges upon one of the intermediate plates, 11, which is near the top of the tower, whereby the ore slurry mixes with the ore tailings pulp before the same has reached a temperature at which the magnesium compounds begin to hydrolyze (before it has reached about 150° F.). A branch conduit 24 is connected through the pump 21 to the recycled ore slurry conduit 23.

With reference to Figure 3, there is illustrated an apparatus in which the third and preferred embodiment of the invention may be carried out and in which also a modified process hereinafter described may be conducted. In this embodiment there is provided an auxiliary heating tower 25 having therein a series of conventional plates 26 (the dish tray type being preferred) and having connected to the top thereof a conduit 27 for the introduction of ore tailings pulp containing ammonia to be recovered, a conduit 28 for the introduction of recycled ore slurry and an outlet conduit 29 for the ammonia vapors and spent vapor. At the bottom of the heating tower 25, there is provided a discharge conduit 30 connected to a retention tank 17. Near the bottom of the tower 25 there is provided an inlet conduit 31 connected to the ammonia vapor outlet conduit 13 of the stripping tower 10, which tower may be of the same construction as the tower illustrated in Figure 1.

The retention tank 17 is provided with an outlet conduit 32 connected to the inlet conduit 12 leading to the top of the ammonia stripping column 10. The said tank is also provided with an outlet conduit 20 for the ore slurry to be recycled which is connected through the pump 21 to the inlet conduit 28.

In hereinbefore mentioned modification of the preferred embodiment of the invention, the heating of the mixture of ore tailings pulp and recycled ore slurry in the heating tower 25 is accomplished through the introduction of live steam into the bottom of said tower. In this case the ammonia gases and waste steam or vapor from the ammonia stripping column is led directly to the ammonia recovery system. With reference to Figure 3 of the drawing, this modified process may be carried out by the introduction of steam into a valved conduit 33 shown connected to the conduit 31, leading to the bottom of the heating tower 25. The ammonia gases and waste steam in this instance are withdrawn through the valved conduit 34 connected to the conduit 13, leading from the top of the ammonia stripping column 10.

It should be understood that the third embodiment of the invention and the modification thereof just described may be partially merged and that the apparatus illustrated in Figure 3 may be operated to accomplish the change. In the combined process, the heat supply for the heating tower 25 is provided in part by the ammonia and vapor gases passing through the conduit 31 and in part by steam introduced through the conduit 33. Under this operation, none of the ammonia gas and waste vapor need be withdrawn through the conduit 34.

In a final embodiment of the invention operable under special circumstances as where the soluble magnesium content of the ammonia-containing ore tailings pulp is not too high, the recovery of the ammonia without excessive magnesium deposition on the plates of the ammonia-stripping column or any other equipment is accomplished by a modification of the first embodiment herein described, in which modification ore recycling is omitted by closing the valved conduit 16 in Figure 1. In this variation the process is carried out by rapidly heating the pulp as by means of live steam in the heater retention tank 17 to a temperature and for a period which causes the magnesium compounds to precipitate out and to deposit on the ore particles, agitating to prevent settling and deposition of the precipitate in the tank, and passing the heat treated pulp to the stripping tower 10.

It should be further understood that the present invention is not limited to the exact procedures or conditions described above or to the specific apparatus illustrated in the drawing, but that it covers all equivalents which will occur to those skilled in the art upon consideration of the general objectives herein described and of the claims appended hereto.

We claim:

1. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, heating said pulp by adding hot ore tailings slurry substantially free of magnesium impurities having such tendency and by direct heat transfer from a hot fluid medium from a temperature below 150° F. to a temperature at which precipitation of said magnesium impurities occurs, until this precipitation has been completed to an extent substantially overcoming the deposition tendency, and evaporating ammonia from the pulp while the same is flowing through a plate distillation column.

2. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, adding to said pulp ore tailings slurry substantially free of magnesium impurities having such tendency, heating the mixture by direct heat transfer from a hot fluid medium from a temperature below 150° F. to a temperature at which precipitation of the magnesium impurities occurs, maintaining the mixture in heated condition until the precipitation of such impurities has proceeded to an extent substantially overcoming the deposition tendency, passing the mixture into and through a plate distillation column and therein evaporating ammonia from the pulp.

3. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, heating said pulp by means of a hot fluid medium mixed with said pulp, from a temperature below 150° F. to a temperature at which the magnesium impurities precipitate, retaining the heated mass until the said magnesium impurities have precipitated to an extent substantially overcoming the deposition tendency, then introducing the treated pulp obtained into a plate distillation column and evaporating the ammonia from the pulp in said column.

4. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, adding to said pulp when the same is at a temperature below 150° F. hot recycled ore tailings slurry substantially freed of magnesium impurities having such tendency, further heating the resulting mixture in a plate tower by direct heat transfer with a gaseous medium to a temperature at which the magnesium impurities present precipitate, continuing the heating until said impurities have precipitated and lost this deposition tendency, and distilling ammonia from the mixture in a plate distillation column ammonia from the mixture in a plate distillation column.

5. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, heating a body of said pulp by direct contact with live steam from a temperature below 150° F. to a temperature at which precipitation of magnesium impurities occurs until this precipitation has been completed to an extent substantially overcoming the deposition tendency, then passing the treated pulp into and through a plate distillation column and therein evaporating ammonia from the pulp.

6. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, adding to a body of said pulp hot recycled ore tailings slurry substantially freed of magnesium impurities having such tendency, steam heating the resulting mixture by direct heat transfer from a temperature below 150° F. to a temperature at which the magnesium impurities precipitate, agitating the mixture to prevent settling, continuing the heating until the precipitation of the magnesium impurities has been completed to an extent substantially overcoming the deposition tendency, flowing the thus heated mixture through a plate column and evaporating off the ammonia from the same while it is in said column.

7. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, introducing said pulp into the top of a plate distillation column, flowing the same countercurrent to a supply of steam, adding to said pulp in the column when the same is at a temperature below 150° F. hot recycled ore tailings slurry substantially freed of magnesium impurities having such tendency thereby heating the pulp to a temperature which causes deposition as the heating continues of magnesium impurities on ore particles in the resulting mixture instead of on the plates of said column, raising the temperature of said mixture in the column to a degree at which the ammonia evaporates and therein distilling off the ammonia.

8. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, adding to said pulp hot recycled ore tailings slurry substantially freed of magnesium impurities having such tendency, heating the resulting mixture in a plate tower by contacting the same with a gaseous heating medium from a temperature below 150° F. to a temperature at which the magnesium impurities precipitate, retaining the resulting hot mixture during agitation until the precipitation of said magnesium impurities has proceeded to an extent substantially overcoming the deposition tendency and finally passing the resulting mixture through a plate distillation column and therein evaporating ammonia from the pulp.

9. A method for recovering ammonia by distillation from nickeliferous ore tailings pulp containing residual ammoniacal leach solution and unstable magnesium, compounds as impurities, which pulp and impurities have a tendency to form deposits on hot heating surfaces at the ammonia distillation temperatures employed comprising, adding to said pulp hot recycled ore tailings slurry substantially freed of magnesium impurities having such tendency, heating the resulting mixture in a plate tower by contacting the same with hot ammonia gas and water vapor obtained by the evaporation step hereinafter described, the mixture being thereby heated from a temperature below 150° F. to a temperature which precipitates the magnesium impurities, retaining and agitating the resulting heated mixture until precipitation of said magnesium impurities has proceeded to an extent substantially overcoming the deposition tendency, thereafter passing the treated pulp into and through a plate distillation column in contact with live steam and therein evaporating ammonia from the mixture and producing the mixture of hot ammonia gas and water vapor employed in the first heating step specified herein.

10. A method for recovering ammonia by distillation from nickeliferous ore tailings pulp containing residual ammoniacal leach solution and unstable magnesium compounds as impurities, which pulp and impurities have a tendency to form deposits on hot heating surfaces at the ammonia distillation temperatures employed comprising, adding to said pulp hot recycled ore tailings slurry substantialy freed of magnesium impurities having such tendency, passing the resulting mixture through a heating tower having dish-tray type plates therein in contact with steam and with hot ammonia gas flowing from an ammonia stripping plate column, raising the temperature of the mixture in the said heating tower from a point below 150° F. to a temperature at which precipitation of the magnesium impurities commences, maintaining the mixture in heated condition until precipitation of said magnesium impurities in the pulp has been completed to an extent substantially overcoming said deposition tendency, passing the mixture through said ammonia stripping plate column wherein ammonia is evaporated off through direct steam heat applied to the mixture and whereby substantial deposition of magnesium impurities and ore particles upon the plates in the ammonia stripping tower is avoided.

ROBERT R. FITZHUGH.
BENJAMIN F. FREDERICK.
BERNARD A. AXELRAD.

REFERENCES CITED

The following references are of record in the file of this patent:

UNITED STATES PATENTS

| Number | Name | Date |
| --- | --- | --- |
| 1,261,005 | Barstow et al. | Apr. 2, 1918 |
| 1,335,474 | Benedict | Mar. 30, 1920 |
| 1,487,145 | Caron | Mar. 18, 1924 |
| 1,781,987 | Means | Nov. 18, 1930 |
| 1,962,150 | Mohler | June 12, 1934 |
| 2,029,467 | Day | Feb. 4, 1936 |
| 2,156,843 | Garrels | May 2, 1939 |
| 2,189,826 | Windecker | Feb. 13, 1940 |
| 2,257,533 | Reich | Sept. 30, 1941 |
| 2,400,114 | Hills | May 14, 1946 |

OTHER REFERENCES

World Engineering Congress, Tokyo 1929 Proceedings, vol. 35, Mining and Metallurgy, part 3 (Non-ferrous Metallurgy and Ore Dressing); edited and published by World Engineering Congress; distributed by Kagakkar Marunonchi, Tokyo, 1931, pages 217–235.